United States Patent [19]
Chabert et al.

[11] 4,191,666
[45] Mar. 4, 1980

[54] STABLE AQUEOUS EMULSIONS OF TRICHLOROTRIFLUOROETHANE AND METHOD

[75] Inventors: Pierre Chabert, Saint-Genis Laval; Louis Foulletier, Oullins, both of France

[73] Assignee: Produits Chimiques Ugine Kuhlmann, France

[21] Appl. No.: 647,859

[22] Filed: Jan. 9, 1976

[30] Foreign Application Priority Data

Jan. 20, 1975 [FR] France ............................... 75 01606

[51] Int. Cl.$^2$ .......................... C11D 1/78; B01J 13/00
[52] U.S. Cl. .................................... 252/545; 252/171; 252/309; 252/389 A; 252/DIG. 17
[58] Field of Search ........ 252/309, 171, 545, DIG. 17

[56] References Cited

U.S. PATENT DOCUMENTS

| | | | |
|---|---|---|---|
| 2,758,093 | 8/1956 | Ernst et al. | 252/DIG. 17 |
| 3,397,150 | 8/1968 | Burt et al. | 252/153 X |
| 3,577,348 | 5/1971 | Clementson | 252/171 X |

*Primary Examiner*—Richard D. Lovering

*Attorney, Agent, or Firm*—Pennie & Edmonds

[57] ABSTRACT

A stable emulsion comprising from about 70% to 98.5% by weight of trichlorotrifluoroethane, from about 1% to 20% by weight of water, and from about 0.5% to 10% by weight of a mixture of:

at least one hydrophilic amine phosphate ester selected from the neutralization product of:
  (a) a phosphoric compound selected from a monophosphoric, diphosphoric, or a mixture of monophosphoric and diphosphoric compounds of:
    (i) straight or branched-chain aliphatic alcohols containing from 6 to 20 carbon atoms; or
    (ii) ether alcohols obtained by the ethoxylation, by 1 to 5 moles of ethylene oxide, of an alkylphenol or of a straight or branched-chain aliphatic alcohol containing from 6 to 20 carbon atoms; and
  (b) a hydrophilic, water-soluble amine selected from primary, secondary, or mixture of such amines; and
at least one lipophilic phosphate ester selected from the neutralization product of (a) and a lipophilic amine;
said mixture of amine phosphate esters containing, by weight thereof, at least 5% by weight of the hydrophilic amine phosphate ester.

8 Claims, No Drawings

STABLE AQUEOUS EMULSIONS OF TRICHLOROTRIFLUOROETHANE AND METHOD

BACKGROUND OF THE INVENTION

The use of emulsions of water in trichlorotrifluoroethane for the cleaning of parts and various objects is well-known. These emulsions make it possible in effect to eliminate in a single operation greasy dirt which is soluble in trichlorotrifluoroethane and dirt which is soluble in water, such as mineral salts and residues of the fluxes used in soldering. Such emulsions, however, are not stable and this limits their use.

SUMMARY OF THE INVENTION

The present invention provides stable water in trichlorotrifluoroethane emulsions suitable for cleaning, which emulsions also provide anti-corrosion protection for metal objects during and subsequent to cleaning.

Briefly stated, the present invention relates to a stable emulsion comprising from about 70% to 98.5% by weight of trichlorotrifluoroethane, from about 1% to 20% by weight of water, and from about 0.5% to 10% by weight of a mixture of:
at least one hydrophilic phosphate ester selected from the neutralization product of:
  (a) a phosphoric compound selected from a monophosphoric, diphosphoric, or a mixture of monophosphoric and diphosphoric compounds of:
    (i) straight or branched-chain aliphatic alcohols containing from 6 to 20 carbon atoms; or
    (ii) ether alcohols obtained by the ethoxylation, by 1 to 5 moles of ethylene oxide, of an alkylphenol or of a straight or branched-chain aliphatic alcohol containing from 6 to 20 carbon atoms; and
  (b) a hydrophilic, water-soluble amine selected from primary, secondary, or mixture of such amines; and
at least one lypophilic phosphate ester selected from the reaction product of (a) and a lipophilic amine;
said mixture of amine phosphate esters containing, by weight thereof, at least 5% by weight of the hydrophilic amine phosphate ester.

DETAILED DESCRIPTION

The trichlorotrifluoroethane (1,1,2-trichloro-1,2,2-trifluoroethane) is the major component of the emulsion comprising, as noted, from about 70% to 98.5%, by weight, of the emulsion.

As to the surface active agent, it is produced from the combination in the form of salts of:
(a) A monophosphoric or diphosphoric ester or a mixture of monophosphoric and diphosphoric esters of straight or branched-chain alcohols containing from 6 to 20 carbon atoms, such as octanol, 2-ethylhexanol, decanol, dodecanol stearyl alcohol, alcohols or mixtures of branched-chain alcohols obtained by the oxo process, or the ether alcohols obtained by the addition of ethylene oxide on to the preceding alcohols or on to alkylphenols such as octylphenol, nonylphenol and containing a number of ethoxy groups of between 1 and 5; and
(b) A pair of amines or mixtures of amines, each of which has been selected from one of the two following groups:
  (i) The first group comprises the secondary amines of the formula RNHR' in which R and R' are aliphatic radicals containing less than 4 carbon atoms and which may contain a primary alcohol function, such as diethylamine, diethanolamine, N-methyl and N-ethyl ethanolamine, dipropylamine, diisopropylamine; and the primary amines of the general formula $R_1NH_2$, in which $R_1$ has the same meaning as the radicals R and R' above, and may also contain ether functions, such as 2-(2-aminoethoxy)ethanol ($H_2N$ $C_2H_4OC_2H_4OH$).

All these amines are very soluble in water and possess a hydrophilic character; and
  (ii) The second group comprises straight-chain or branched aliphatic amines containing a number of carbon atoms of between 6 and 20, such as hexylamine, octylamine, 2-ethylhexylamine, dodecylamine, stearylamine, oleylamine, commercial mixtures of fatty amines containing a number of carbon atoms of between 8 and 20, cyclic amines such as cyclohexylamine, N-methylcyclohexylamine, N-ethylcyclohexylamine, dicyclohexylamine, the diamines $R_2$-NH $C_3H_6NH_2$ in which $R_2$ is an alkyl radical containing 8 to 20 carbon atoms, and commercial mixtures containing these amines, for example, oleylaminopropaneamine and stearylaminopropaneamine, the polyamines $H_2N$ $(C_2H_4NH)_n$ $C_2H_4NH_2$ such as diethylenetriamine, triethylenetetramine, tetraethylenepentamine. All these amines are sparingly soluble or insoluble in water and soluble in oils and non-polar solvents, and possess a lipophilic character, except the polyamines which, although very soluble in water, give, in combination with the phosphoric esters, salts which are very sparingly soluble in water but soluble in non-polar organic solvents and, therefore, belong to this group.

The relative quantities of the two amines or mixtures of amines or their respective combinations with an ester or a mixture of phosphoric esters depend on the amines chosen and the nature of the ester and/or of the composition of the mixture of esters.

The composition of the mixture of amine phosphate esters must contain at least 5% of the hydrophilic phosphate ester of an amine of the first group.

The acidity of the phosphoric esters—a strong acidity in the case of the monoesters whose second acidity is too weak to react usefully with the amines—must be neutralized very exactly by the amines. An excess of amine of more than 2% or a deficit of more than 5% of amine as compared with the quantity necessary to neutralize the strong acidity of the phosphoric esters exactly are unfavorable to the formation of the emulsion and its stability. Stated differently, the neutralization is carried out with a quantity of amines between 95% to 102% of the quantity stoichiometrically necessary.

One thus obtains perfectly stable emulsions which may contain quantities of water equal to or greater than twice the quantity of surface active agent used.

The invention will be further described in connection with the following examples which are set forth for purposes of illustration only and are not to be construed as limiting the scope thereof in any manner.

EXAMPLE 1

A commercial octylphosphoric acid (mixture of phosphates of monooctyl 60 mole % and dioctyl 40 mole %) is neutralized exactly (within ±1%) with diisopropylamine on the one hand and dodecylamine on the other and mixtures of the resultant products used to prepare a series of 2% solutions in trichlorotrifluoroethane.

Water is gradually added to each of these solutions which are agitated mechanically, so that the water is "solubilized", forming a clear and colorless emulsion which is stable when at rest.

Table I shows the maximum quantity of water which is solubilizable in 100 g. of 2% solution of mixture of amine octylphosphates, reckoned on the composition by weight of this mixture.

Table I

MAXIMUM QUANTITY OF WATER SOLUBILIZABLE AT 20° C. IN 2% SOLUTIONS OF MIXTURES OF DIISO-PROPYLAMINE OCTYLPHOSPHATE AND DODECYLAMINE OCTYLPHOSPHATE

| COMPOSITION BY WEIGHT OF THE MIXTURE OF OCTYLPHOSPHATES | | MAXIMUM QUANTITY OF WATER SOLUBILIZABLE |
|---|---|---|
| diisopropylemine % | dodecylamine % | g/100 g. of solution |
| 100 | 0 | less than 0.1 |
| 82 | 18 | 0.5 |
| 80 | 20 | 6 |
| 68 | 32 | 6 |
| 62 | 38 | 2.5 |
| 53 | 47 | 1.5 |
| 0 | 100 | less than 0.1 |

The octylphosphoric acid used in this example, the optimum composition of the mixture of amine octylphosphates is:
68 to 80% of diisopropylamine octylphosphate
32 to 20% of dodecylamine octylphosphate

EXAMPLE 2

2% solutions in trichlorotrifluoroethane are prepared of mixtures of diisopropylamine tridecylphosphates and a commercial oleyl aminopropaneamine; obtained by neutralizing a tridecylphosphoric acid (tridecylphosphate, 70 mole %, bistridecylphosphate, 30 mole %) with varying quantities of a mixture of 70% diisopropylamine and 30% of oleylaminopropaneamine.

Table II shows the maximum quantity of water which is solubilizable in 100 g. of 2% solution of the tridecylphosphates of amines reckoned on the rate of neutralization of the acid, that is to say, on the ratio:

$$\frac{\text{number of amine functions}}{\text{number of acid functions}}$$

It shows that an excess of amine of 5% reduces considerably the quantity of water which is emulsifiable, while a deficit of 5% hardly reduces it.

TABLE II

MAXIMUM QUANTITY OF WATER WHICH IS SOLUBILIZABLE AT 20° C. IN A 25% SOLUTION OF A MIXTURE OF DIISOPROPYLAMINE AND OLEYLAMINO-PROPANEAMINE TRIDECYLPHOSPHATES IN RELATION TO THE RATE OF NEUTRALIZATION OF THE TRIDECYLPHOSPHORIC ACID

| RATE OF NEUTRALIZATION OF THE ACID | 92 | 95 | 97 | 100 | 102 | 105 |
|---|---|---|---|---|---|---|
| Maximum quantity of water solubilizable g/100 g. of solution | 3.5 | 4.8 | 5.1 | 5.1 | 5.1 | 1 |

EXAMPLE 3

A clear emulsion which is stable in the vicinity of 20° C. is obtained by mixing by moderate agitation:

| | |
|---|---|
| diisopropylamine tridecylphosphate | 80 g. |
| oleylaminopropaneamine tridecylphosphate | 20 g. |
| water | 200 g. |
| trichlorotrifluoroethane | 700 g. |

This emulsion with 20% of water is not of much interest for cleaning, but can be used for transportation in the concentrated form. It can be diluted with trichlorotrifluoroethane to make from it emulsions containing 8, 6, 4 and 2% of water containing 4, 3, 2 and 1% of surface active agent. These dilute emulsions are stable from 20° C. to at least 45°–46° C., the boiling point of the emulsion.

EXAMPLE 4

A phosphate of NP4 (mixture of the phosphoric monoester and diester of nonylphenol ethoxylated with 4 moles of ethylene oxide per mole of nonylphenol) is neutralized with diisopropylamine and oleylaminopropaneamine, and one prepares with the products of the neutralization an emulsion having the following composition:

| | |
|---|---|
| salt of the phosphate of NP4 and diisopropylamine | 5.8 g. |
| salt of the phosphate of NP4 and oleylaminopropaneamine | 14.2 g. |
| water | 60 g. |
| trichlorotrifluoroethane | 920 g. |

EXAMPLE 5

A clear, stable emulsion is prepared from the following composition:

| | |
|---|---|
| diisopropylamine tridecylphosphate | 7.3 g. |
| N-methylcyclohexylamine tridecylphosphate | 12.7 g. |
| water | 40 g. |
| trichlorotrifluoroethane | 940 g. |

EXAMPLE 6

A clear, stable emulsion is prepared from the following composition:

| | |
|---|---|
| diethanolamine tridecylphosphate | 18.2 g. |
| dodecylamine tridecylphosphate | 1.8 g. |
| water | 50 g. |
| trichlorotrifluoroethane | 930 g. |

EXAMPLE 7

A clear, stable emulsion is prepared from the following composition:

| | |
|---|---|
| diethylamine tridecylphosphate | 18.4 g. |
| oleylaminopropaneamine tridecylphosphate | 1.6 g. |
| water | 50 g. |
| trichlorotrifluoroethane | 930 g. |

EXAMPLE 8

A clear, stable emulsion is prepared from the following composition:

| | |
|---|---|
| diisopropylamine octylphosphate | 17.9 g. |
| diethylenetriamine octylphosphate | 2.1 g. |
| water | 60 g. |
| trichlorotrifluoroethane | 920 g. |

EXAMPLE 9

A clear, stable emulsion is prepared from the following composition:

| | |
|---|---|
| diglycolamine tridecylphosphate | 15.0 g. |
| dodecylamine tridecylphosphate | 5.0 g. |
| water | 50 g. |
| trichlorotrifluoroethane | 930 g. |

EXAMPLE 10

An emulsion is formed from:

| | |
|---|---|
| diisopropylamine tridecylphosphate | 1.6 g. |
| oleylaminopropaneamine tridecylphosphate | 0.4 g. |
| water | 4 g. |
| trichlorotrifluoroethane | 100 g. |

This is the same formulation as the emulsion of Example 3, apart from the concentrations of water and surface active agent.

Previously polished test pieces of cast iron are half-immersed in the emulsion for one month and, after such immersion, no trace of corrosion appears; the test pieces remain perfectly polished both in the immersed part and in the unimmersed part.

Identical test pieces are immersed for several minutes in the same emulsion and then rinsed rapidly with a jet of trichlorotrifluoroethane. When dipped in water, they do not wet, and when exposed for three days in an atmosphere saturated with water vapor, they remain intact, while control test pieces are completely covered with rust in twenty-four hours.

Plates of copper plated plastic material used in the manufacture of electronic circuits are cleaned in this composition at boiling point for a few minutes. They are then rinsed rapidly with a jet of trichlorotrifluoroethane. It is possible to carry out soldering on these plates without any special difficulty.

This illustrates on the one hand the protective properties exerted by the emulsions of the invention on metal parts, and, on the other hand, the fact that this protective action does not upset the machining operations which may subsequently take place.

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. A stable emulsion consisting essentially of from about 70% to 98.5% by weight of trichlorotrifluoroethane, from about 1% to 20% by weight of water, and from about 0.5% to 10% by weight of a mixture of:
   at least one hydrophilic amine phosphate ester selected from the group consisting of the neutralization product of:
   (a) a phosphoric compound selected from a group consisting of monophosphoric, diphosphoric, and a mixture of monophosphoric and diphosphoric compounds of:
      (i) straight or branched-chain aliphatic alcohols contained from 6 to 20 carbon atoms; or
      (ii) ether alcohols obtained by the ethoxylation, by 1 to 5 moles of ethylene oxide, of an alkylphenol or of a straight or branched-chain aliphatic alcohol containing from 6 to 20 carbon atoms; and
   (b) a hydrophilic, water-soluble amine selected from the group consisting of primary, secondary, and a mixture of such amines; and
   at least one lipophilic phosphate ester selected from the group consisting of the neutralization product of (a) and a lipophilic amine;
   said mixture of amine phosphate esters containing, by weight thereof, at least 5% by weight of the hydrophilic amine phosphate ester.

2. The emulsion of claim 1 wherein the neutralization of the phosphoric compound is carried out with an amount of amines of between 95% to 102% of the amount stoichiometrically required.

3. The emulsion of claim 1 wherein the hydrophilic, water-soluble amine is a secondary amine having the formula RNHR' in which R and R' are aliphatic radicals containing less than 4 carbon atoms.

4. The emulsion of claim 1 wherein the hydrophilic, water-soluble amine is a primary amine having the formula $R_1NH_2$ in which $R_1$ is an aliphatic radical containing less than 4 carbon atoms.

5. The emulsion of claim 1 wherein the lipophilic amine is selected from the group consisting of a straight or branched-chain aliphatic amine having 6 to 20 carbon atoms; fatty amines containing 8 to 20 carbon atoms; cyclic amines; diamines of the formula $R_2$—$NHC_3H_6NH_2$ in which $R_2$ is $C_8$ to $C_{20}$ alkyl radical; and mixtures of such amines.

6. The emulsion of claim 1 wherein the hydrophilic amine phosphate ester is selected from the group consisting of diisopropylamine octylphosphate, diisopropylamine tridecylphosphate, diethanolamine tridecylphosphate, diethylamine tridecylphosphate, diglycolamine tridecylphosphate, and mixtures thereof, and the lipophilic amines phosphate ester is selected from the group consisting of dodecylamine octylphosphate, oleylaminopropaneamine tridecylphosphate, N-methylcyclohexylamine tridecylphosphate, dodecylamine tridecylphosphate, diethylenetriamine octylphosphate, and mixtures thereof.

7. The method of cleaning an object comprising cleaning the object with the emulsion of claim 1.

8. The method of cleaning a metallic object comprising cleaning the object with the emulsion of claim 6.

* * * * *